US009946466B2

(12) United States Patent
Lee

(10) Patent No.: US 9,946,466 B2
(45) Date of Patent: Apr. 17, 2018

(54) MOBILE ELECTRONIC DEVICE INCLUDING EMBEDDED MEMORY

(71) Applicant: Samsung Electronics Co., Ltd., Suwon-si (KR)

(72) Inventor: Sang-Kil Lee, Seongnam-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 98 days.

(21) Appl. No.: 14/738,583

(22) Filed: Jun. 12, 2015

(65) Prior Publication Data

US 2016/0054917 A1 Feb. 25, 2016

(30) Foreign Application Priority Data

Aug. 19, 2014 (KR) ........................ 10-2014-0107838

(51) Int. Cl.
*G06F 12/08* (2016.01)
*G06F 3/06* (2006.01)

(52) U.S. Cl.
CPC .............. *G06F 3/061* (2013.01); *G06F 3/068* (2013.01); *G06F 3/0656* (2013.01); *G06F 2212/1016* (2013.01)

(58) Field of Classification Search
CPC ............. G06F 2212/1016; G06F 3/061; G06F 3/0656; G06F 3/068
See application file for complete search history.

(56) References Cited

U.S. PATENT DOCUMENTS 8,331,857 B2 12/2012 Abdulla et al.
8,332,606 B2 12/2012 Boldyrev et al.
8,719,492 B1 5/2014 Asnaashari
2001/0011326 A1* 8/2001 Yoshikawa ............ G06F 12/08 711/119
2008/0140918 A1 6/2008 Sutardja
2008/0189485 A1 8/2008 Jung et al.
2010/0246588 A1 9/2010 Davis
2011/0153916 A1 6/2011 Chinnaswamy et al.
2012/0026802 A1 2/2012 Confalonieri
2013/0080621 A1 3/2013 Jain et al.
2013/0080693 A1 3/2013 Kim et al.
2013/0159602 A1 6/2013 Adams et al.
2013/0290599 A1 10/2013 Jain et al.

OTHER PUBLICATIONS

Young Je Moon et al. / Process Persistence Method using New Memory / Computing Practice and Letter vol. 19, No. 12, p. 653-657.

* cited by examiner

*Primary Examiner* — Yong Choe
(74) *Attorney, Agent, or Firm* — Muir Patent Law, PLLC

(57) ABSTRACT

An electronic device may include first and second semiconductor chips. The first semiconductor chip may include a processor and a first memory. The second semiconductor chip may include a second memory. The first memory and second memory may be configured to exchange first data and second data with the processor, respectively. The processor may be configured to exchange target data processed or to be processed with the first and second memories. The processor may be configured to determine the target data as the first data if the number of accesses of the target data is equal to or greater than a first reference value. The processor may be configured to determine the target data as the second data if the number of accesses of the target data is less than the first reference value.

18 Claims, 16 Drawing Sheets

100

110

113

Processor

Embedded Memory

External Memory

130

| Access target data | Recently accessed time | Time lapsed | Data type |
|---|---|---|---|
| Data A | 72782999 | 27217000 | DAT2 |
| Data B | 63823523 | 36176476 | DAT2 |
| Data C | 97524080 | 2475919 | DAT1 |
| Data D | 93274338 | 6725661 | DAT1 |
| ... | | | |
| Data N | 96624358 | 3375641 | DAT1 |

MOBILE ELECTRONIC DEVICE INCLUDING EMBEDDED MEMORY

CROSS-REFERENCE TO RELATED APPLICATIONS

The present application claims priority under 35 U.S.C. § 119 to Korean Patent Application No. 10-2014-0107838 filed on Aug. 19, 2014, the entire contents of which are incorporated herein in their entirety by reference.

BACKGROUND

Field of the Invention

The present invention relates to an electronic device, and more particularly, to a mobile electronic device including a processor and an embedded memory.

Description of the Related Art

Various electronic devices are widely being used. The electronic device performs various functions using electric signals and pieces of electronically stored data. The electronic device may include a processor for processing signals and data. In addition, the electronic device may include a memory for storing data.

Small-sized electronic devices are being manufactured, as design and process technologies are advanced. Small-sized electronic devices, such as a notebook computer, a mobile terminal, a portable phone, and so on, may be portable and are easily transported by a user. Recently, a "wearable electronic device", which may be put on a user's body, is being developed.

The wearable electronic device is manufactured to have a small size for convenience of the user. When the size of the electronic device decreases, the size of an integrated circuit chip included in the electronic device typically should also be reduced. In addition, the total amount of power to be supplied from a power supply device (e.g., battery) may be reduced when the size of the electronic device decreases.

For example, a small-sized electronic device may include a buffer memory for temporarily buffering data processed or to be processed by a processor, and a nonvolatile memory for retaining data irrespective of whether power is supplied. The wearable electronic device considerably performs a function requiring a small amount of computation, rather than a function requiring a large amount of computation. For this reason, it may be fine that the wearable electronic device does not include a buffer memory having a large buffering capacity. In addition, a nonvolatile memory leaking a large amount of power is not suitable for the wearable electronic device.

SUMMARY

An example embodiment of the present invention may provide a mobile electronic device which includes a first semiconductor chip and a second semiconductor chip. The first semiconductor chip may include a processor, and a first memory. The second semiconductor chip may include a second memory. The first memory may be configured to exchange first data with the processor. The second memory may be configured to exchange second data with the processor. The processor may be configured to exchange target data processed or to be processed with the first and second memories. The processor may be configured to determine the target data as the first data, and to store the target data in the first memory if the number of accesses of the target data is equal to or greater than a first reference value. The processor may be configured to determine the target data as the second data, and to store the target data in the second memory if the number of accesses of the target data is less than the first reference value.

An example embodiment of the present invention may provide a mobile electronic device which includes a first semiconductor chip and a second semiconductor chip. The first semiconductor chip may include a processor. The second semiconductor chip may include a first memory and a second memory. The first memory may be configured to exchange first data with the processor and the second memory may be configured to exchange second data with the processor. The second memory may have a storage capacity greater than the first memory. The processor may be configured to exchange target data processed or to be processed with the first and second memories. The processor may be configured to determine the target data as the first data, and to store the target data in the first memory if the number of accesses of the target data is equal to or greater than a first reference value. The processor may be configured to determine the target data as the second data, and to store the target data in the second memory if the number of accesses of the target data is less than the first reference value.

An example embodiment of the present invention may provide a mobile electronic device which includes a first semiconductor chip. The first semiconductor chip may include a processor, a first memory, and a second memory. The first and second memories may be configured to exchange first data and second data with the processor, respectively. The second memory may have a storage capacity greater than the first memory. The processor may be configured to exchange target data processed or to be processed with the first and second memories. The processor may be configured to determine the target data as the first data, and to store the target data in the first memory if the number of accesses of the target data is equal to or greater than a first reference value. The processor may be configured to determine the target data as the second data, and to store the target data in the second memory if the number of accesses of the target data is less than the first reference value.

An example embodiment of the present invention may provide a method of operating an electronic device. The method may include exchanging first data between a processor and a first memory, the processor and the first memory included in a first semiconductor chip; exchanging second data between the processor and a second memory included in a second semiconductor chip; receiving an access request with respect to target data processed or to be processed by the processor; determining the target data as the first data and storing the target data in the first memory if the number of accesses of the target data is equal to or greater than a first reference value; and determining the target data as the second data and storing the target data in the second memory if the number of accesses of the target data is less than the first reference value.

An example embodiment of the present invention may provide a method of operating an electronic device. The method may include exchanging first data between a processor and a first memory, the processor and the first memory included in a first semiconductor chip; exchanging second data between the processor and a second memory included in the first semiconductor chip; receiving an access request with respect to target data processed or to be processed by the processor; determining the target data as the first data and storing the target data in the first memory if the number of accesses of the target data is equal to or greater than a first reference value; and determining the target data as the second data and storing the target data in the second memory if the number of accesses of the target data is less than the first reference value.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF EMBODIMENTS

Figure 1:
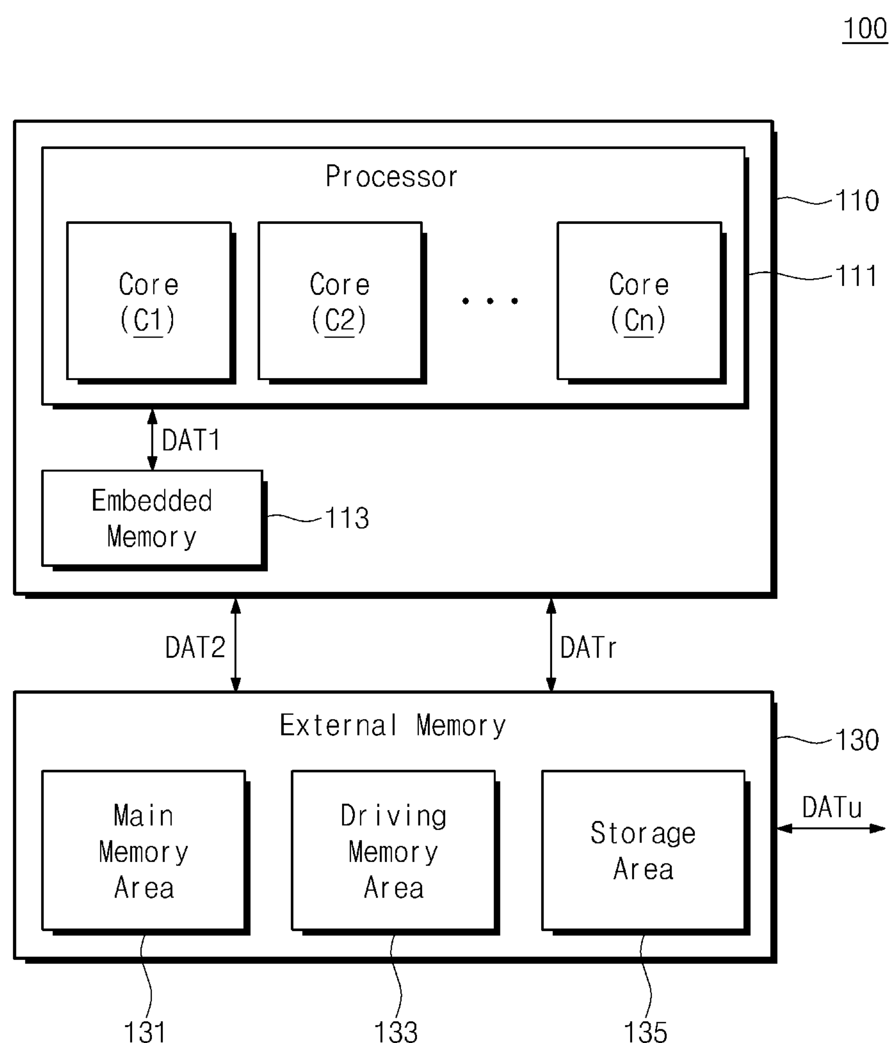
FIG. 1 is a block diagram illustrating a configuration of a mobile electronic device according to an example embodiment of the present invention.

Embodiments of the present disclosure will be described in detail with reference to the accompanying drawings. The present invention, however, may be embodied in various different forms, and should not be construed as being limited only to the illustrated embodiments. Accordingly, known processes, elements, and techniques are not described with respect to some of the example embodiments of the present invention. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. Unless indicated otherwise, these terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms such as "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element is referred to as being "connected" or "coupled" to another element or on another element, it may be directly connected or coupled to or on the other element or intervening elements may be present. In contrast, when an element is referred to as being "directly connected" or "directly coupled" to another element or on another element, there are no intervening elements present. Other words used to describe the relationship between elements should be interpreted in a like fashion (e.g., "between" versus "directly between," "adjacent" versus "directly adjacent," etc.). However, the term "contact" refers to direct contact, unless the context indicates otherwise.

Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a configuration of a mobile electronic device 100 according to an example embodiment of the present invention. The mobile electronic device 100 may include a first semiconductor chip 110 and a second semiconductor chip 130. The first and second semiconductor chips 110 and 130 may be portions of different wafers. In one embodiment, the first semiconductor chip 110 may include a processor 111 and an embedded memory 113. For example, the processor 111 and the embedded memory 113 may form portions of the first semiconductor chip 110 (e.g., a system on chip, SoC). In one embodiment, the second semiconductor chip 130 may be an external memory. For example, the external memory may form part of or compose the entire the second semiconductor chip 130. In one embodiment, the first and second semiconductor chips 110 and 130 disclosed herein may be formed in a package (e.g., a stack chip package), package on package (PoP), or formed via wafer level three dimensional (3D) integration (e.g., stacking at the wafer level where one of the chips is singulated and stacked on the other, which is not yet singulated from its wafer) using through-substrate vias (TSVs).

As used herein, a semiconductor device may refer to various items such as a memory device, one or more logic devices or memory cells formed in or on a semiconductor substrate, a semiconductor chip, a memory chip, a memory die, a logic chip, a package, or combinations thereof. A semiconductor device such as a semiconductor chip, a memory chip, a memory die, or a logic chip may be formed from a wafer. A semiconductor device may comprise a package which may include one or more chips stacked on a package substrate, or a package-on-package device including a plurality of packages. A semiconductor memory device refers to a semiconductor device that includes one or more memory array, such as a semiconductor memory chip (e.g., volatile or non-volatile memory).

An electronic device, as used herein, may refer to one of these devices and may also include products that include these devices, such as a memory card, a memory module, a hard drive including additional components, a mobile phone, laptop, tablet, desktop, camera, server, computing system, memory system, or other consumer electronic device, etc.

The processor 111 may include one or more processor cores C1 through Cn. The one or more processor cores C1 through Cn of the processor 111 may process data and signals. The mobile electronic device 100 may perform its own function with the processed data and signals. As an example embodiment, the processor 111 may include, for example, an application processor, a microprocessor, graphics processing unit GPU, or a central processing unit CPU.

The embedded memory 113 may exchange first data DAT1 with the processor 111. The first data DAT1 may be data processed or to be processed by the one or more processor cores C1 through Cn. The embedded memory 113 may manage the first data DAT1. For instance, the embedded memory 113 may buffer the first data DAT1. For example, the embedded memory 113 may operate as a buffer memory or a working memory of the processor 111. The embedded memory 113 will be more described with reference to FIGS. 3 and 4.

As an example embodiment, the mobile electronic device 100 may be a wearable electronic device. The wearable electronic device considerably performs a function requiring a small amount of computation, rather than a function requiring a large amount of computation. Thus, it may be fine that the embedded memory 113 does not have a large buffering capacity if the mobile electronic device 100 is the wearable electronic device.

As an example embodiment, the embedded memory 113 may be a static random access memory (SRAM). The SRAM may operate faster than a dynamic RAM (DRAM). When the SRAM is embedded in the first semiconductor chip 110 as the embedded memory 113, it may be possible to obtain the mobile electronic device 100 that has a small size and a fast operating time. In addition, when the SRAM is embedded in the first semiconductor chip 110 as the embedded memory 113, the amount of active power consumed by the mobile electronic device 100 may be reduced.

As an example embodiment, the embedded memory 113 may be a magneto-resistive RAM (MRAM). The density of integration of the MRAM may be easily increased than that of the SRAM, and power leakage of the MRAM may be smaller than that of the SRAM.

Thus, when the MRAM is embedded in the first semiconductor chip 110 as the embedded memory 113, it may be possible to obtain the embedded memory 113 having a relatively larger buffering capacity. In addition, when the MRAM is embedded in the first semiconductor chip 110 as the embedded memory 113, it is possible to obtain the mobile electronic device 100 that consumes a small amount of power.

The external memory 130 may include a main memory area 131, a driving memory area 133, and a storage area 135. The external memory 130 may exchange second data DAT2 and driving data DATr with the first semiconductor chip 110 (more particularly, with the processor 111). Further, the external memory 130 may exchange user data DATu with a user.

The main memory area 131 may manage the second data DAT2. For instance, the main memory area 131 may buffer the second data DAT2. The second data DAT2 may be data processed or to be processed by the one or more processor cores C1 through Cn. For example, the main memory area 131 may operate similarly to the embedded memory 113. The embedded memory 113 and the main memory area 131 will be more described with reference to FIGS. 5 through 8.

The driving memory area 133 may load the driving data DATr. The driving data DATr may be data used to drive hardware and software. As an example embodiment, the driving data DATr may include data associated with an operating system. As an example embodiment, the driving data DATr may include data associated with a preloaded application (e.g., an application for controlling communications, an application for managing power, and so on). For instance, the driving data DATr may be stored in a read-only memory (ROM) in advance. Alternatively, the driving data DATr may be stored in the storage area 135 or another memory device in advance. The driving data DATr which is stored in advance may be loaded on the driving memory area 133. The processor 111 may perform an operation for processing a function to be performed based on the loaded driving data DATr.

The storage area 135 may store the user data DATu. The user data DATu may be provided by a user. For instance, the user data DATu may include data associated with an application downloaded by the user. Alternatively, the user data DATu may include data associated with a document or a media provided from the user. The storage area 135 will be more described with reference to FIGS. 9 and 10.

FIG. 1 illustrates that the external memory 130 includes the main memory area 131, the driving memory area 133, and the storage area 135. However, the external memory 130 may further include one or more memory areas having other functions. FIG. 1 is provided to help understanding of the present invention, and the present invention is not limited thereto.

As an example embodiment, memory areas included in the external memory 130 may be physically separated from one another. For example, each of the memory areas included in the external memory 130 may perform its own function in a distinct physical area. As another example embodiment, the memory areas included in the external memory 130 may be logically separated. For example, a mapping table which includes information of correspondence between physical memory areas of the external memory 130 and logically distinct areas may be used. For instance, data associated with the mapping table may be stored in the external memory 130 or another memory.

Memory addresses of the memory areas included in the external memory 130 may be determined statically upon manufacturing the mobile electronic device 100. Alternatively, memory addresses of the memory areas included in the external memory 130 may be determined by a user of the mobile electronic device 100, as necessary. Still alternatively, memory addresses of the memory areas included in the external memory 130 may be dynamically changed or modified while the mobile electronic device 100 is being used.

As an example embodiment, the external memory 130 may be a phase-change RAM (PRAM). Power leakage of the PRAM may be relatively low. Further, unlike a NAND flash memory which is accessed in page unit or block unit, the PRAM is randomly accessed in byte unit. Thus, when the external memory 130 is implemented with the PRAM, stand-by power consumption of the mobile electronic device 100 may be considerably reduced, thereby making it possible for the mobile electronic device 100 to operate rapidly. In one embodiment, the external memory 130 may have a storage capacity greater than the embedded memory 113.

In one embodiment, the processor 111 and the embedded memory 113 are integral and form the first semiconductor chip 110. In one embodiment, the second semiconductor chip 130 may be an external memory. For example, the external memory forms all or part of the second semiconductor chip 230

The processor 111, the embedded memory 113, and the external memory 130 may transmit data in compliance with various interface protocols. For instance, the processor 111, the embedded memory 113, and the external memory 130 may transmit data in compliance with one or more of universal serial bus (USB), small computer system interface (SCSI), peripheral component interconnect express (PCIe), advanced technology attachment (ATA), parallel ATA (PATA), serial ATA (SATA), serial attached SCSI (SAS), integrated drive electronics (IDE), universal flash storage (UFS), and so on.

Figure 2:
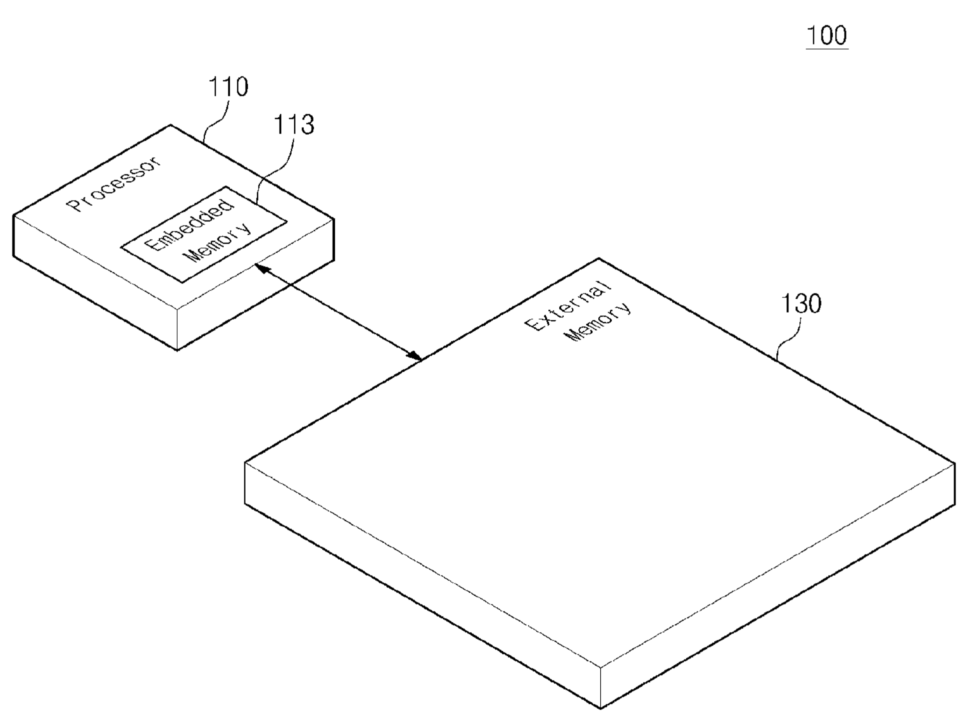
FIG. 2 is a conceptual diagram illustrating a configuration of a mobile electronic device shown in FIG. 1 according to an example embodiment.

FIG. 2 is a conceptual diagram illustrating a configuration of a mobile electronic device 100 shown in FIG. 1 according to an example embodiment.

One or more processor cores C1 through Cn (refer to FIG. 1) included in a processor 111 (refer to FIG. 1) may be mounted on a first semiconductor chip 110. In addition, an embedded memory 113 may be mounted on the first semiconductor chip 110 together with the one or more processor cores C1 through Cn. For example, the embedded memory 113 may share a die with the one or more processor cores C1 through Cn. The embedded memory 113 may be connected with the one or more processor cores C1 through Cn through a conductive line (e.g., a metal line) provided on a substrate layer (e.g., a silicon layer) of the first semiconductor layer 110.

The external memory 130 may be mounted on a second semiconductor chip 120 that is separate from the first semiconductor chip 110. For example, the external memory 130 does not share a die with the one or more processor cores C1 through Cn. The external memory 130 may be connected with the one or more processor cores C1 through Cn s a conductive line or wires for connecting the first semiconductor chip 110 and the second semiconductor chip 120.

As described with reference to FIG. 1, the embedded memory 113 may operate as a buffer memory or a working memory of the processor 111. When the embedded memory 113 shares a die with the processor 111 (i.e., a buffer memory or a working memory is embedded in the first semiconductor chip 110), a length of an input/output channel for transmitting first data DAT1 (refer to FIG. 1) between the processor 111 and the embedded memory 113 may be shortened, and an input/output logic and a driver for controlling an input/output of the first data DAT1 may be removed. Thus, the amount of power consumed on transmitting of the first data DAT1 may be reduced. In addition, time taken to transmit the first data DAT1 may be shortened, and the total amount of energy consumed by the mobile electronic device 100 may be reduced.

When the embedded memory 113 shares a die with the processor 111, the size of mobile electronic device 100 may be reduced, and the amount of power consumed by the mobile electronic device 100 may be reduced. In particular, when the mobile electronic device 100 is a wearable electronic device, the wearable electronic device having a small size and capable of being used for a long time may improve user satisfaction.

Figure 3:
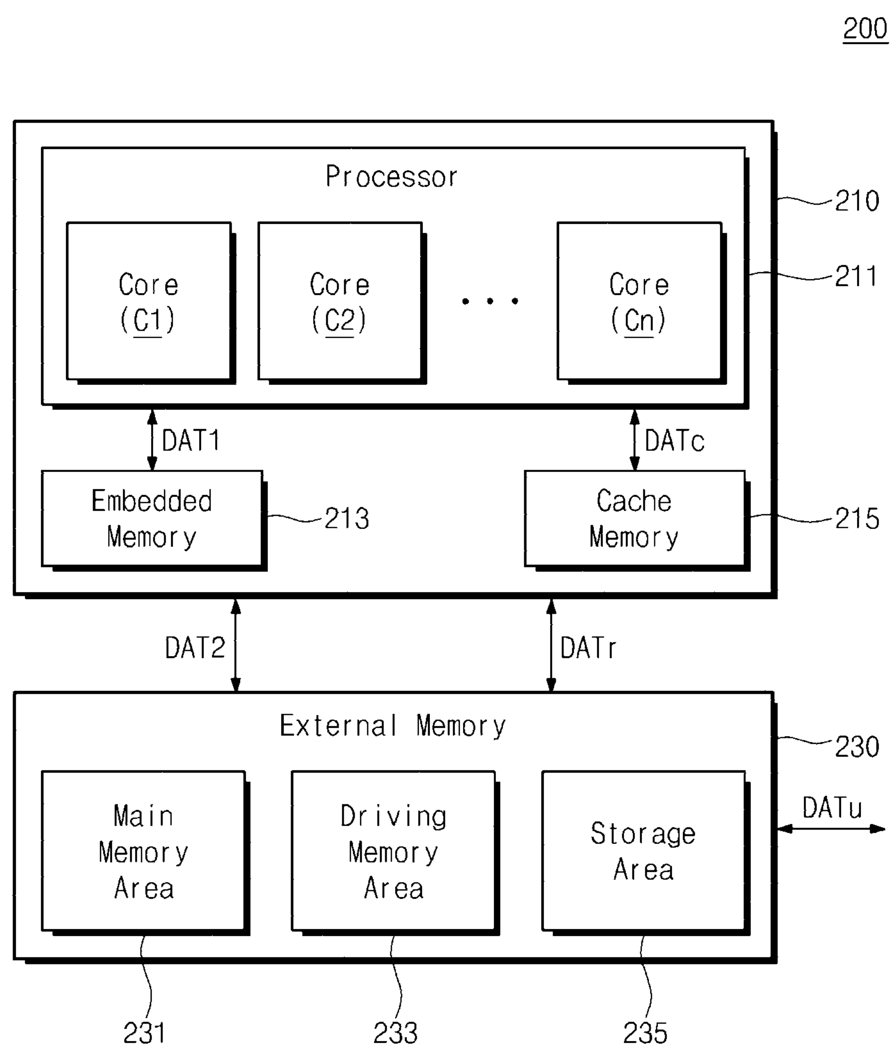
FIG. 3 is a block diagram illustrating a configuration of a mobile electronic device according to an example embodiment of the present invention.

FIG. 3 is a block diagram illustrating a configuration of a mobile electronic device 200 according to an example embodiment of the present invention. The mobile electronic device 200 may include a first semiconductor chip 210 and a second semiconductor chip 220. The first and second semiconductor chips 210 and 230 are portions of different wafers. In one embodiment, the first semiconductor chip 210 may include a processor 211, an embedded memory 213, and a cache memory 215. For example, the processor 211, the embedded memory 213, and the cache memory 215 are integral and form the first semiconductor chip 210. In one embodiment, the second semiconductor chip 230 may be an external memory. For example, the external memory forms all or part of the second semiconductor chip 230.

Configurations and operations of the processor 211, the embedded memory 213, and the external memory 230 may include those of a processor 111, an embedded memory 113, and an external memory 130 shown in FIG. 1. Redundant descriptions associated with configurations and operations of the processor 211, the embedded memory 213, and the external memory 230 will be omitted below for brevity of the description.

The cache memory 215 may be mounted on the first semiconductor chip 210 together with one or more processor cores C1 through Cn of the processor 211 and the embedded memory 213. The cache memory 215 may store cache data DATc. The cache memory DATc may be data to be used by the one or more processor cores C1 through Cn. The cache memory 215 may have a small storage capacity, but the cache memory 215 may operate rapidly. When the cache memory 215 is used, the number of accesses of the processor 211 to the embedded memory 213 (in order words, the total access time of the processor 211) may be reduced, thus, the operating speed of the mobile electronic device 200 may become faster.

In order to help understanding, FIG. 3 illustrates that the cache memory 215 is separated from the processor 211. However, the present invention is not limited thereto. For instance, the cache memory 215 may be implemented to be included in the processor 211.

In one embodiment, the external memory 230 may have a storage capacity greater than the embedded memory 213, and the cache memory 215 may have a storage capacity less than the embedded memory 213.

Figure 4:
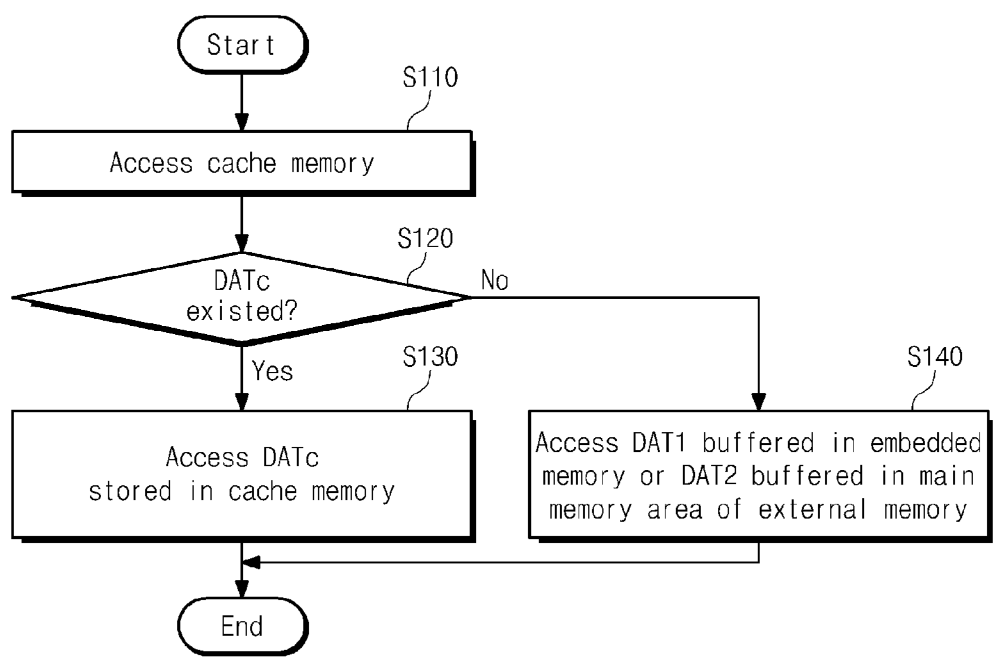
FIG. 4 is a flow chart describing an operation of a mobile electronic device shown in FIG. 3 according to an example embodiment.

FIG. 4 is a flow chart describing an operation of a mobile electronic device 200 shown in FIG. 3 according to an example embodiment. In order to describe the operation of the mobile electronic device 200, FIGS. 3 and 4 are referred together.

In operation S110, a processor 211 may access a cache memory 215. The processor 211 may search target data to be used (i.e., processed) by one or more processor cores C1 through Cn of the processor 211.

In operation S120, the processor 211 may determine whether the target data is stored in the cache memory 215. In particular, the processor 211 may determine whether the target data is stored as cache data DATc. In response to determining that the target data is stored as the cache data DATc (i.e., "cache hit"), the method may proceed to operation S130. On the other hand, in response to determining that the target data is not stored as the cache data DATc (i.e., "cache miss"), the method may proceed to operation S140.

In operation S130, the processor 211 may access the cache memory 215. When the target data is stored in the cache memory 215 as the cache data DATc, the one or more processor cores C1 through Cn of the processor 211 may access the cache data DATc.

In operation S140, the processor 211 may access the embedded memory 213 or the external memory 230. When the target data is not stored in the cache memory 215 as the cache data DATc, the one or more processor cores C1 through Cn of the processor 211 may access the target data as first data DAT1 buffered in the embedded memory 213. Alternatively, when the target data is not stored in the cache memory 215 as the cache data DATc, the one or more processor cores C1 through Cn of the processor 211 may access the target data as second data DAT2 buffered in a main memory area 231 of the external memory 230.

Similarly to the description of FIG. 1, the embedded memory 213 may operate as a buffer memory or a working memory of the processor 211. In addition, the main memory area 231 included in the external memory 230 may operate similarly to the embedded memory 213.

When the embedded memory 213 is implemented with an SRAM, the buffering capacity may not be sufficient. In order to provide a sufficient buffering capacity, the main memory area 231 included in the external memory 230 may operate as a main memory of the processor 211 together with the embedded memory 213. Thus, it is possible to optimize the performance of the mobile electronic device 200.

As described above, the external memory 230 may be implemented with a PRAM. However, the PRAM is not robust to the iteration of frequent data reading/writing. For example, when data reading/writing is iterated in the PRAM, the life of the PRAM may be shortened. Thus, when the external memory 230 is implemented with the PRAM, it is necessary to minimize the number of accesses to the main memory area 231.

In order to minimize the number of accesses to the main memory area 231, target data which is frequently accessed may be buffered in the embedded memory 213 as the first data DAT1, and target data which is not frequently accessed may be buffered in the main memory area 231 as the second data DAT2. As an example embodiment, whether the target data is frequently accessed may be determined based on the number of accesses to the target data. As an example embodiment, whether the target data is frequently accessed may be determined based on a time interval between a recently accessed time and a currently accessed time associated with the target data. The first data DAT1 and the second data DAT2 will be more described with reference to FIGS. 5 through 8.

Figure 5:
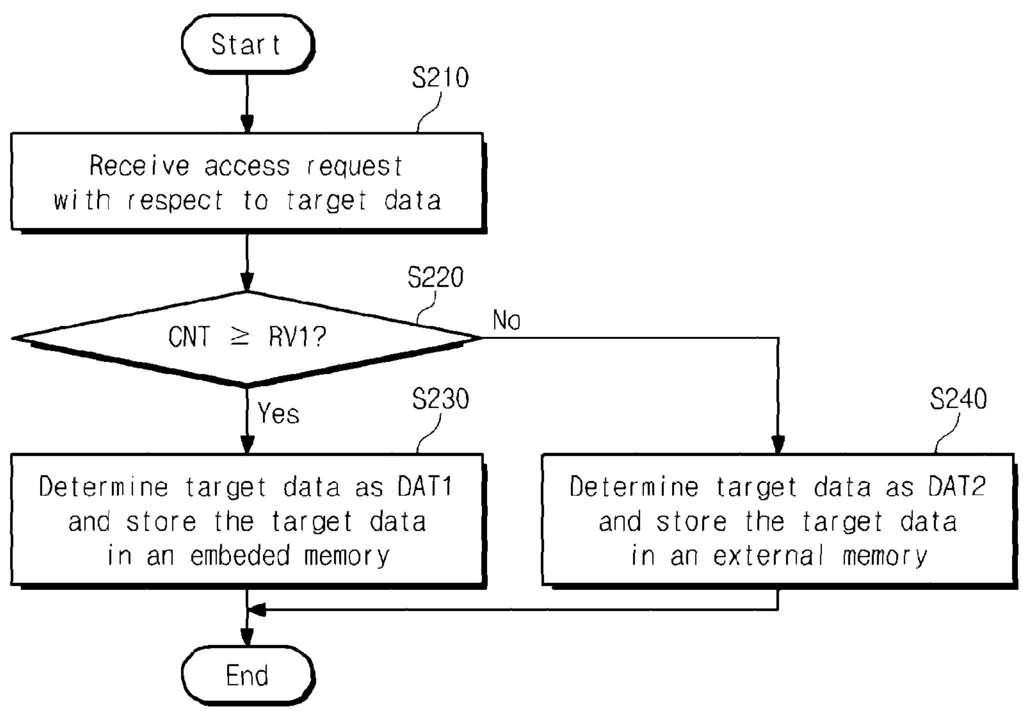
FIG. 5 is a flow chart describing an operation of a mobile electronic device shown in FIG. 1 according to an example embodiment.

FIG. 5 is a flow chart describing an operation of a mobile electronic device 100 shown in FIG. 1 or a mobile electronic device 200 shown in FIG. 3 according to an example embodiment. In order to describe the operation of the mobile electronic device 100, FIGS. 1 and 5 are referred together.

In operation S210, a processor 111 may receive an access request with respect to target data. The target data may be data processed or to be processed by one or more processor cores C1 through Cn of the processor 111.

In operation S220, the processor 111 may determine whether an access count value CNT associated with the target data is greater than or equal to a reference value RV1. The reference value RV1 may be variable as necessary. For instance, when the target data is frequently accessed, the access count value CNT associated with the target data may be greater than or equal to the reference value RV1. For example, when the target data is not frequently accessed, the access count value CNT associated with the target data may be smaller than the reference value RV1. When the access count value CNT is greater than or equal to the reference value RV1, the processor 111 may proceed to operation S230. When the access count value CNT is smaller than the reference value RV1, the processor 111 may proceed to operation S240.

In operation S230, the target data may be determined as first data DAT1, for example, when the access count value CNT is greater than or equal to the reference value RV1, the one or more processor cores C1 through Cn of the processor 111 may determine the target data to be the first data DAT1 and store the target data in an embedded memory 113.

In operation S240, the target data may be determined as second data DAT2, for example, when the access count value CNT is smaller than the reference value RV1, the one or more processor cores C1 through Cn of the processor 111 may determine the target data to be the second data DAT2 and store the target data in an external memory 130.

Figure 6:
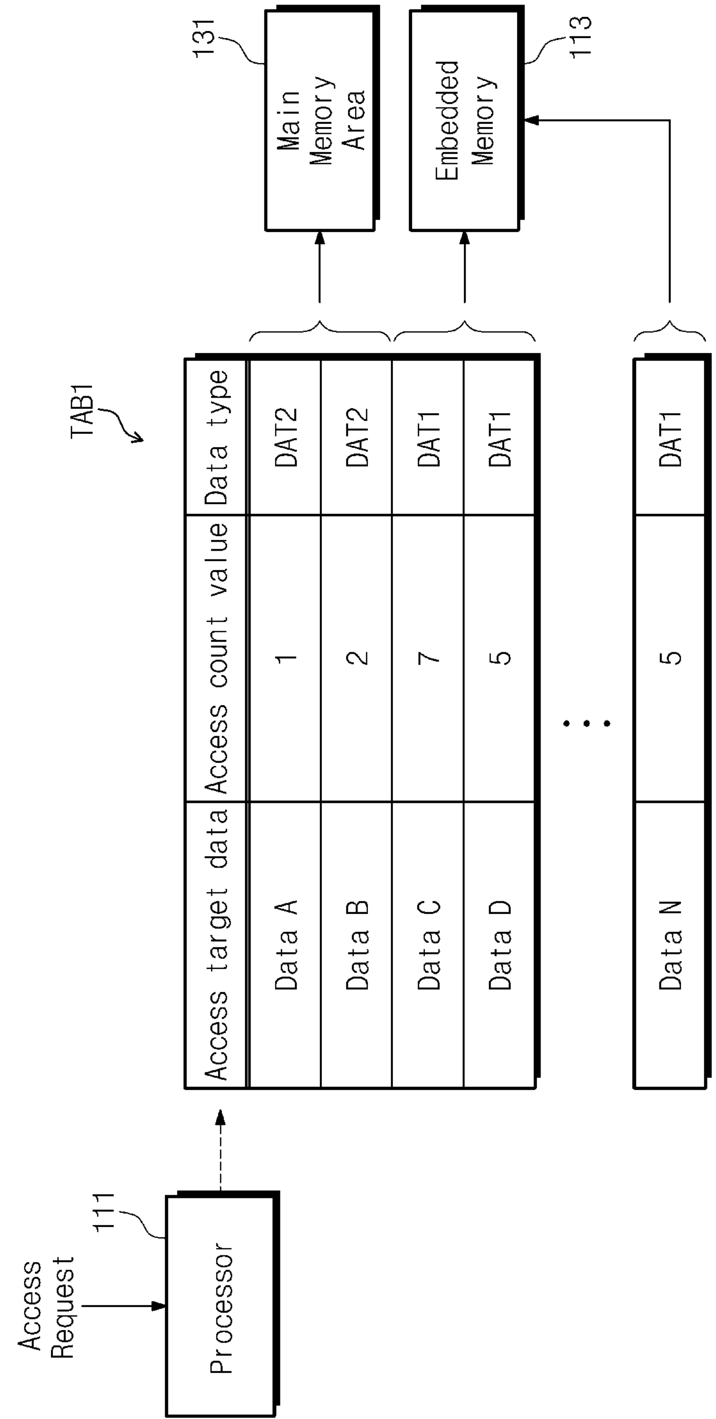
FIG. 6 is a conceptual diagram for describing an operation of a mobile electronic device described in FIG. 5 according to an example embodiment.

FIG. 6 is a conceptual diagram for describing an operation of a mobile electronic device 100 described in FIG. 5 according to an example embodiment. FIGS. 1, 5, and 6 are referred together to help understanding.

A processor 111 may receive an access request with respect to target data (refer to operation S210). Further, the processor 111 may refer to a table TAB1 to determine whether the target data is frequently accessed. For instance, the table TAB1 may include information associated with an access count value and a data type of data to be accessed. However, this instance is just exemplary, and the present invention is not limited thereto. The table TAB1 may further include other kinds of information.

As an example embodiment, the table TAB1 may be managed by an operating system. For instance, when the access request is issued to the processor 111, the operating system may update the contents of the table TAB1. As an example embodiment, data of the table TAB1 may be stored in an embedded memory 113 or a main memory area 131 of an external memory 130.

The processor 111 may refer to the table TAB1 to determine whether the target data is frequently accessed (refer to operation S220). In order to help understanding, it is assumed that a reference value RV1 is 3. According to this assumption, the target data that is accessed three or more times may be regarded as frequently accessed data. Under this assumption, the processor 111 may determine whether an access count value CNT associated with the target data is greater than or equal to 3.

For example, access count values CNTs of data A and data B are 1 and 2, respectively (i.e., the data A and the data B have been accessed less than three times). This may mean that the data A and the data B are not frequently accessed data. One or more processor cores C1 through Cn of the processor 111 may determine the data A and the data B to be second data DAT2 (refer to operation S240). The data A and the data B determined to be second data DAT2 may be stored in the main memory area 131.

For example, access count values CNTs of data C, data D, and data N are 7, 5, and 5, respectively (i.e., the data C, the data D, and the data N have been accessed more than three times). This may mean that the data C, data D, and data N are frequently accessed data. The one or more processor cores C1 through Cn of the processor 111 may determine the data C, data D, and data N to be first data DAT1 (refer to operation S230). The data C, data D, and data N determined to be first data DAT1 may be stored in the embedded memory 113.

According to an example embodiment described with reference to FIGS. 5 and 6, target data which is frequently accessed may be stored in the embedded memory 113 as the first data DAT1. For example, target data which is not frequently accessed may be stored in the main memory area 131 as the second data DAT2. Thus, the number of access to the main memory area 131 may be minimized. As a result, the performance of the mobile electronic device 100 may be optimized, and the life of the external memory 130 may not be shortened.

However, FIGS. 5 and 6 are only exemplary for understanding of an example embodiment of the present invention. Modifications or changes associated with determination of the first data DAT1 and the second data DAT2, the reference value RV1, information included in the table TAB1, and management of the table TAB1 may be made as necessary. FIGS. 5 and 6 are not intended to limit the present invention.

Figure 7:
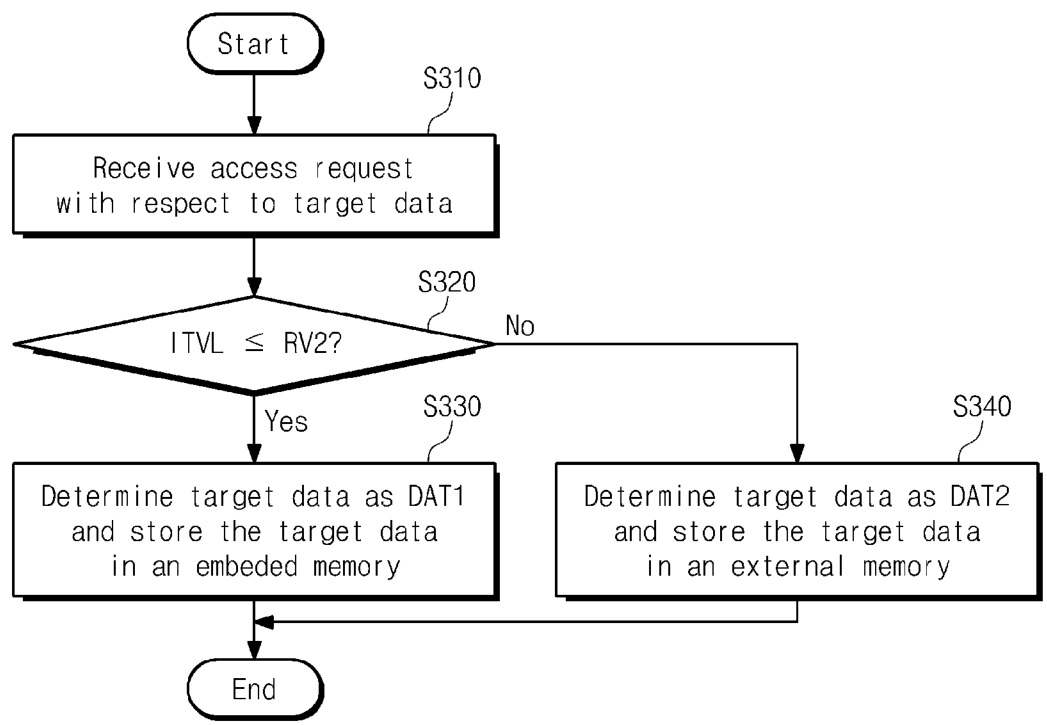
FIG. 7 is a flow chart describing an operation of a mobile electronic device shown in FIG. 1 according to an example embodiment.

FIG. 7 is a flow chart describing an operation of a mobile electronic device 100 shown in FIG. 1 or a mobile electronic device 200 shown in FIG. 3 according to an example embodiment. In order to describe the operation of the mobile electronic device 100, FIGS. 1 and 7 are referred together.

In operation S310, a processor 111 may receive an access request with respect to target data. The target data may be data processed or to be processed by one or more processor cores C1 through Cn of the processor 111.

In operation S320, the processor 111 may determine whether a time interval value ITVL between a recently accessed time and currently accessed time associated with the target data is smaller than or equal to a reference value RV2. The reference value RV2 may be variable as necessary. For instance, when the target data is frequently accessed, the time interval value ITVL may smaller than or equal to the reference value RV2. For example, when the target data is not frequently accessed, the time interval value ITVL may be greater than the reference value RV2. When the time interval value ITVL is smaller than or equal to the reference value RV2, the processor 111 may proceed to operation S330. When the time interval value ITVL is greater than the reference value RV2, the processor 111 may proceed to operation S340.

In operation S330, the target data may be determined to be first data DAT1, for example, when the time interval value ITVL is smaller than or equal to the reference value RV2, the one or more processor cores C1 through Cn of the processor 111 may determine the target data to be the first data DAT1 and store the target data in an embedded memory 113.

In operation S340, the target data may be determined to be second data DAT2, for example, when the time interval value ITVL is greater than the reference value RV2, the one or more processor cores C1 through Cn of the processor 111 may determine the target data to be the second data DAT2 and store the target data in an external memory 130.

Figure 8:
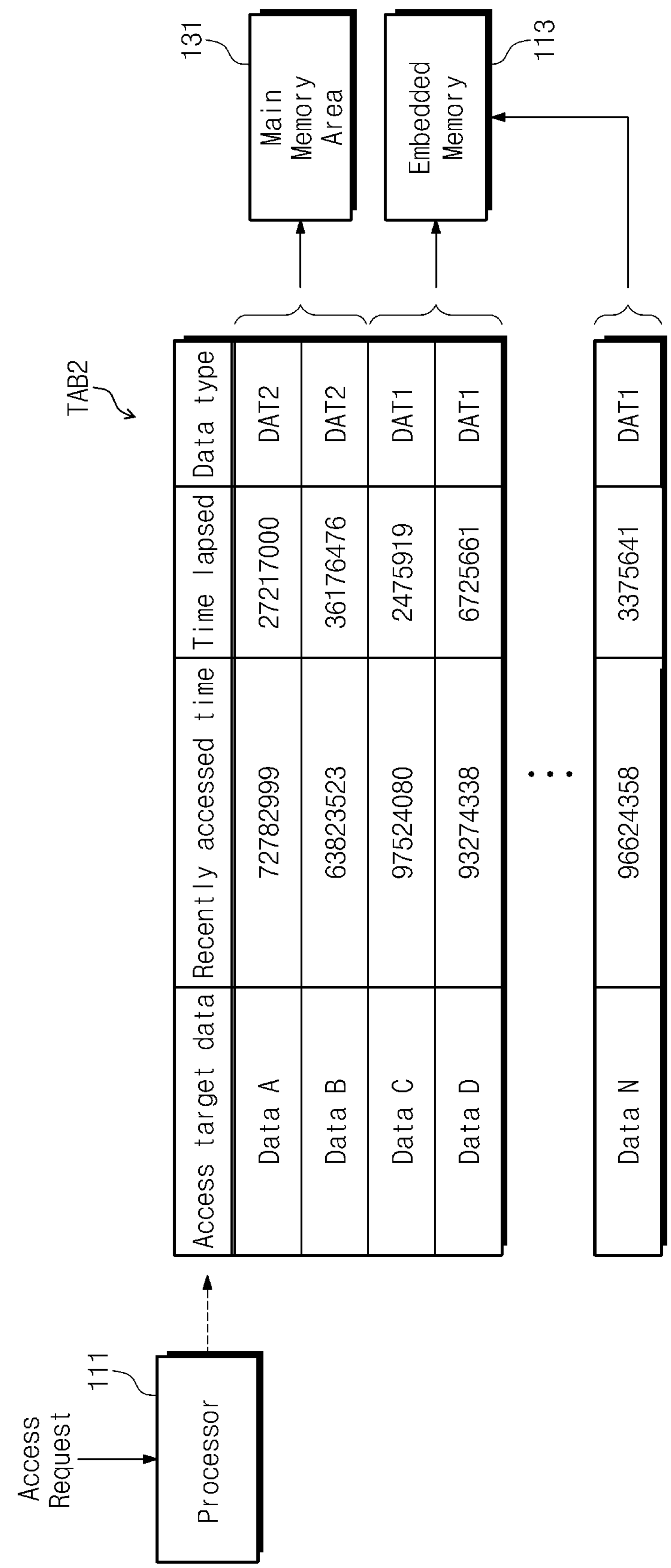
FIG. 8 is a conceptual diagram for describing an operation of a mobile electronic device described in FIG. 7 according to an example embodiment.

FIG. 8 is a conceptual diagram for describing an operation of a mobile electronic device 100 described in FIG. 7 according to an example embodiment. FIGS. 1, 7, and 8 are referred together to help understanding.

A processor 111 may receive an access request with respect to target data (refer to operation S310). Further, the processor 111 refers to a table TAB2 to determine whether the target data is frequently accessed. For instance, the table TAB2 may include information associated with a recently accessed time, a time interval value between the recently accessed time and a currently accessed time, and a data type of data to be accessed. However, this instance is just exemplary, and the present invention is not limited thereto. The table TAB2 may further include other kinds of information. In order to help understanding, time of the table TAB2 is expressed in nanosecond unit.

As an example embodiment, the table TAB2 may be managed by an operating system. For instance, when the access request is issued to the processor 111, the operating system may update the table TAB2. As an example embodiment, data of the table TAB2 may be stored in an embedded memory 113 or a main memory area 131 of an external memory 130.

The processor 111 may refer to the table TAB2 to determine whether the target data is frequently accessed (refer to operation S320). In order to help understanding, it is assumed that a reference value RV2 is "10000000". According to this assumption, the target data that has been accessed within a time before 10000000 nanoseconds from a currently accessed time may be regarded as frequently accessed data. Under this assumption, the processor 111 may determine whether a time interval value ITVL is smaller than or equal to "10000000".

For example, time interval values ITVLs of data A and data B are "27217000" and "36176476" (i.e., the data A and the data B have been accessed earlier than a time before 10000000 nanoseconds from a currently accessed time). This may mean that the data A and the data B are not frequently accessed data. Thus, one or more processor cores C1 through Cn of the processor 111 may determine the data A and the data B to be second data DAT2 (refer to operation S240). The data A and the data B determined to be second data DAT2 may be stored in the main memory area 131.

For example, time interval values ITVLs of data C, data D, and data N are "2475919", "6725661", and "3375641" (i.e., the data C, data D, and data N have been accessed within a time before 10000000 nanoseconds from a currently accessed time). This may mean that the data C, data D, and data N are frequently accessed data. Thus, the one or more processor cores C1 through Cn of the processor 111 may determine the data C, data D, and data N to be first data DAT1 (refer to operation S230). The data C, data D, and data N determined to be first data DAT1 may be stored in the embedded memory 113.

According to an example embodiment described with reference to FIGS. 7 and 8, target data which is frequently accessed may be stored in the embedded memory 113 as the first data DAT1. For example, target data which is not frequently accessed may be stored in the main memory area 131 as the second data DAT2. Thus, the number of access to the main memory area 131 may be minimized. As a result, the performance of the mobile electronic device 100 may be optimized, and the life of the external memory 130 may not be shortened.

However, FIGS. 7 and 8 are only exemplary for understanding of an example embodiment of the present invention. Modifications or changes associated with determination of the first data DAT1 and the second data DAT2, the reference value RV2, information included in the table TAB2, and a time management unit may be made as necessary. FIGS. 7 and 8 are not intended to limit the present invention.

FIGS. 5 through 8 are only exemplary for understanding of example embodiments of the present invention. Whether target data is frequently accessed may be determined with another method different from those described with reference to FIGS. 5 through 8.

Figure 9:
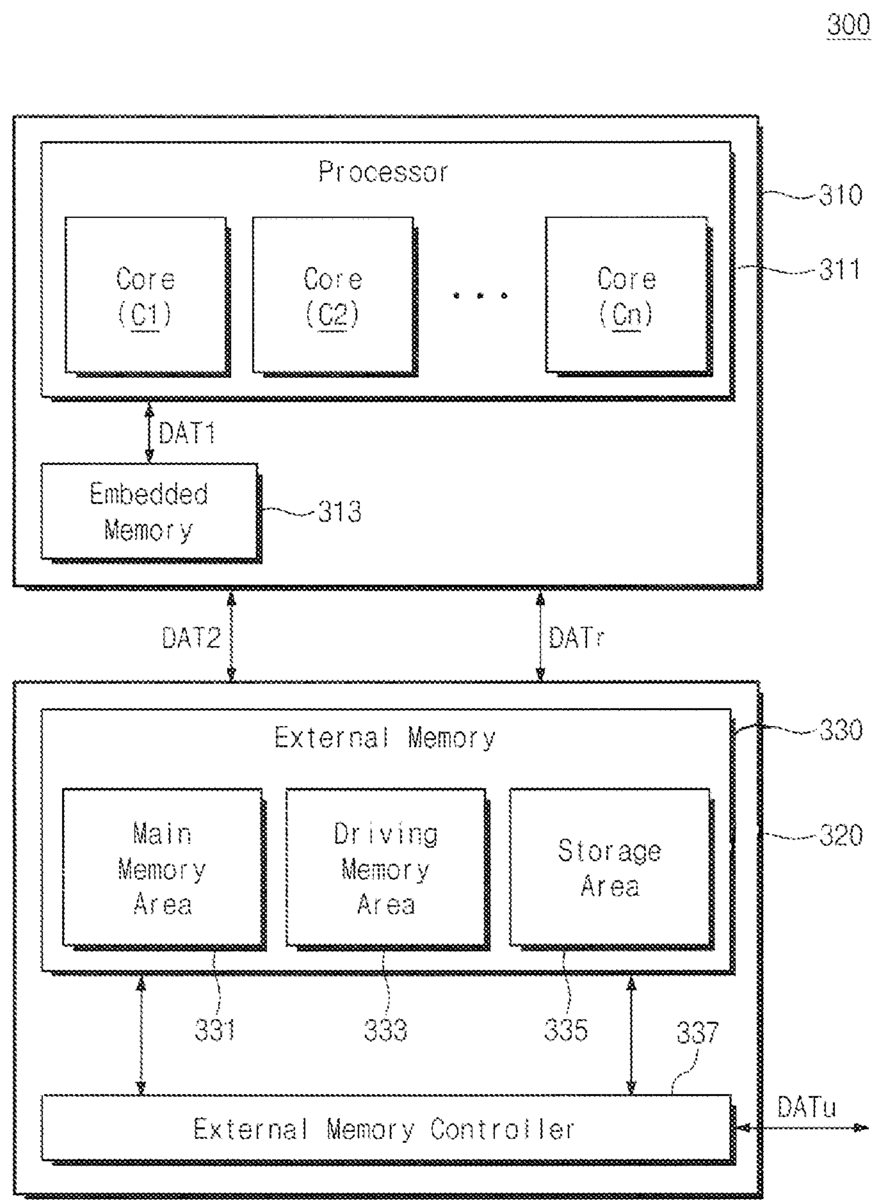
FIG. 9 is a block diagram illustrating a configuration of a mobile electronic device according to an example embodiment of the present invention.

FIG. 9 is a block diagram illustrating a configuration of a mobile electronic device 300 according to an example embodiment of the present invention. The mobile electronic device 300 may include a first semiconductor chip 310 and a second semiconductor chip 320. The first and second semiconductor chips 310 and 320 may be formed from portions of different wafers. In one embodiment, the first semiconductor chip 310 may include a processor 311 and an embedded memory 313. For example, the processor 311 and the embedded memory 313 are integral and form the first semiconductor chip 310. In one embodiment, the second semiconductor chip 320 may include an external memory 330 and an external memory controller 337. For example, the external memory 330 and the external memory controller 337 are integral and form the second semiconductor chip 320. The external memory 330 may include a main memory area 331, a driving memory area 333, and a storage area 335.

Configurations and operations of the processor 311, the embedded memory 313, the main memory area 331, the driving memory area 333, and the storage area 335 may include those of a processor 111, an embedded memory 113, a main memory area 131, a driving memory area 133, and a storage area 135 shown in FIG. 1. Redundant descriptions associated with configurations and operations of the processor 311, the embedded memory 313, the main memory area 331, the driving memory area 333, and the storage area 335 will be omitted below for brevity of the description.

The external memory controller 337 may control operations of the external memory 330. For instance, the external memory controller 337 may control an operation for storing user data DATu in the storage area 335. As described above, the user data DATu may be provided by a user. For instance, the user data DATu may include data associated with an application downloaded by the user. Alternatively, the user data DATu may include data associated with a document or a media provided from the user.

Under a control of the external memory controller 337, the user data DATu may be directly provided to the external memory 330 without being buffered in the embedded memory 313. As an example embodiment, the external memory controller 337 may control the external memory 330 such that the user data DATu is stored in the storage area 335 after being buffered in the main memory area 331.

Figure 10:
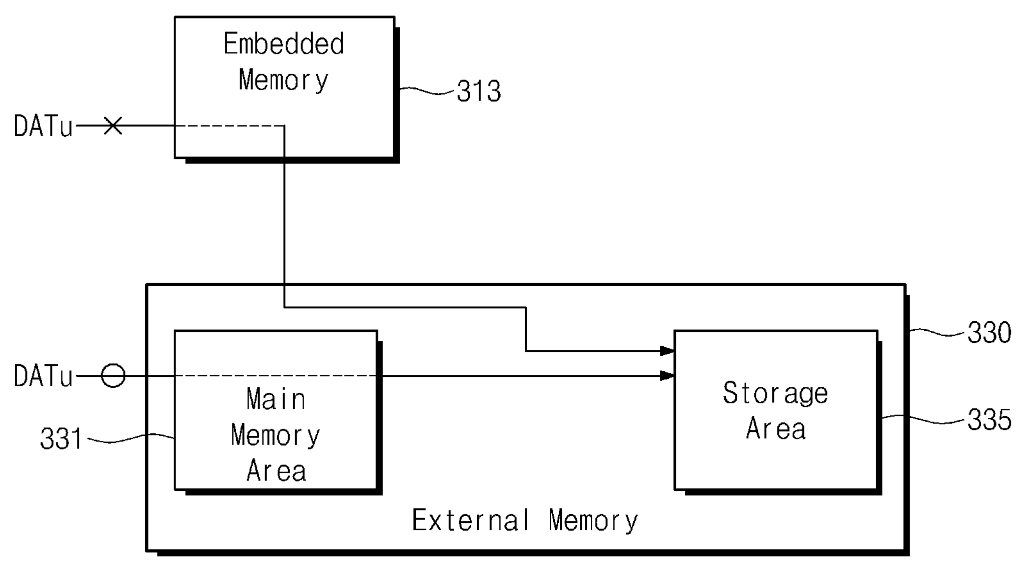
FIG. 10 is a conceptual diagram for describing an operation of a mobile electronic device shown in FIG. 9 according to an example embodiment.

FIG. 10 is a conceptual diagram for describing an operation of a mobile electronic device 300 shown in FIG. 9 according to an example embodiment. In order to describe the operation of the mobile electronic device 300, FIGS. 9 and 10 are referred together.

When user data DATu is provided to the mobile electronic device 300 by a user, the user data DATu may be stored in a storage area 335. However, the user data DATu may not be buffered in an embedded memory 313. Instead, the user data DATu may be directly provided to an external memory 330. As an example embodiment, the user data DATu may be stored in the storage area 335 after being buffered in a main memory area 331. An external memory controller 337 may control an operation of storing the user data DATu in the storage area 335.

Unlike an example embodiment of FIG. 10, when the user data DATu is buffered in the embedded memory 313, the length of the path where the user data DATu is transferred may become longer. Thus, the amount of power consumed to store the use data DATu may increase, and time taken to store the user data DATu may become longer. As a result, the total amount of energy consumed by the mobile electronic device 300 may increase when the user data DATu is buffered in the embedded memory 313.

However, in the example embodiment of FIG. 10, the user data DATu may be directly provided to the external memory 330. According to this example embodiment, the length of the path where the user data DATu is transferred may become shorter. Thus, the amount of power consumed to store the user data DATu may decrease, and speed for storing the user data DATu may become faster. As a result, the total amount of energy consumed by the mobile electronic device 300 may decrease when the user data DATu is buffered in the main memory area 331, not in the embedded memory 313.

Figure 11:
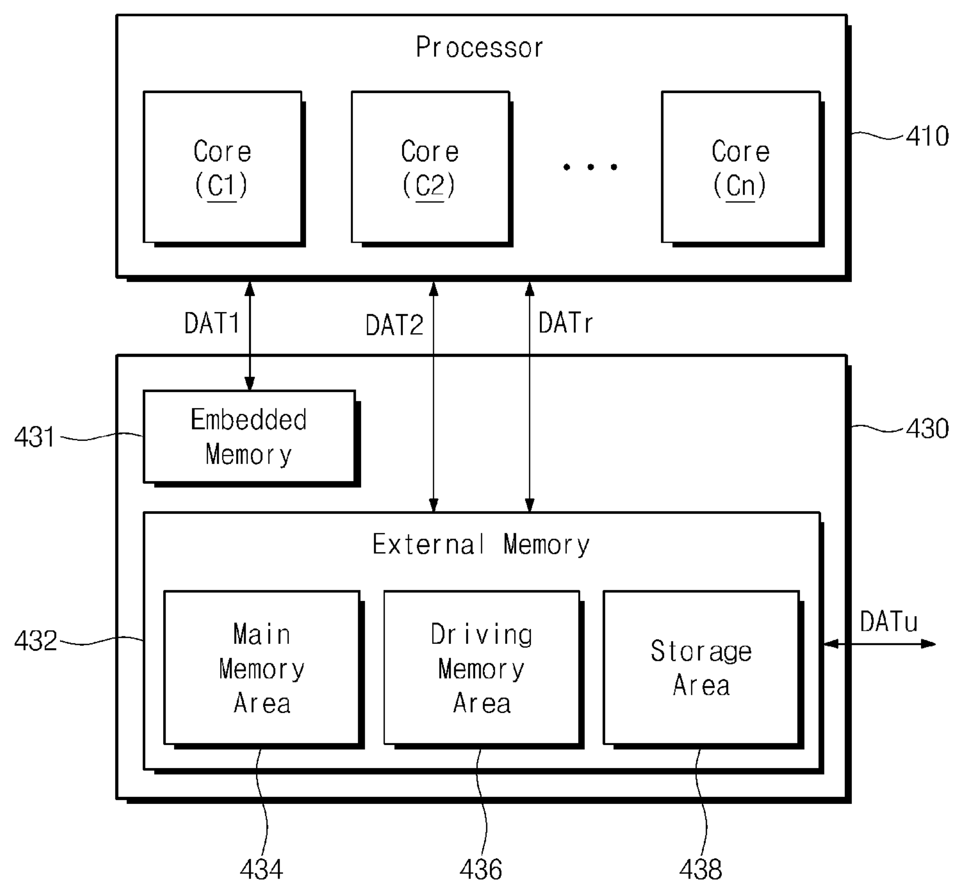
FIG. 11 is a block diagram illustrating a configuration of a mobile electronic device according to an example embodiment of the present invention.

FIG. 11 is a block diagram illustrating a configuration of a mobile electronic device 400 according to an example embodiment of the present invention. The mobile electronic device 400 may include a first semiconductor chip 410 and a second semiconductor chip 430. The first and second semiconductor chips 410 and 430 are portions of different wafers. In one embodiment, the first semiconductor chip 410 may be a processor 410. For example, the processor forms all or part of the first semiconductor chip 410. In one embodiment, the second semiconductor chip 430 may include an embedded memory 431 and an external memory 432. For example, the embedded memory 431 and the external memory 432 forms all or part of the second semiconductor chip 430.

The processor 410 may include one or more processor cores C1 through Cn. The one or more processor cores C1 through Cn of the processor 410 may process data and signals. The mobile electronic device 400 may perform its own function with the processed data and signals. As an example embodiment, the processor 410 may include, for example, an application processor, a microprocessor, graphics processing unit GPU, or a central processing unit CPU.

As an example embodiment, the processor 410 may include a cache memory. When the cache memory is used, an operating speed of the mobile electronic device 400 may become faster. Descriptions associated with the cache memory have been mentioned with reference to FIGS. 3 and 4.

The embedded memory 431 may exchange first data DAT1 with the processor 410. The first data DAT1 may be data processed or to be processed by the one or more processor cores C1 through Cn of the processor 410. The embedded memory 431 may manage the first data DAT1. For instance, the embedded memory 431 may buffer the first data DAT1. For example, the embedded memory 431 may operate as a buffer memory or a working memory of the processor 410.

The external memory 432 may include a main memory area 434, a driving memory area 436, and a storage area 438. The external memory 432 may exchange second data DAT2 and driving data DATr with the processor 410. In addition, the external memory 432 may exchange user data DATu with a user.

The main memory area 434 may manage the second data DAT2. For instance, the main memory area 434 may buffer the second data DAT2. The second data DAT2 may be data processed or to be processed by the one or more processor cores C1 through Cn. That is, the main memory area 434 may operate similarly to the embedded memory 431.

Operations of the embedded memory 431 and the main memory area 434 have been described with reference to FIGS. 5 through 8. For instance, target data which is frequently accessed, from among multiple pieces of target data processed or to be processed by the one or more processor cores C1 through Cn of the processor 410, may be buffered in the embedded memory 431 as first data DAT1. For example, target data which is not frequently accessed, from among the multiple pieces of target data processed or to be processed by the one or more processor cores C1 through Cn of the processor 410, may be buffered in the main memory area 434 as second data DAT2. Thus, it is possible to minimize the number of accesses to the main memory area 434. As a result, the performance of the mobile electronic device 400 may be optimized, and the life of the external memory 432 may not be shortened.

The driving memory area 436 may load the driving data DATr. The driving data DATr may be data used to drive hardware and software. The driving data DATr may be stored in a ROM in advance. Alternatively, the driving data DATr may be stored in the storage area 438 or another memory device in advance. The driving data DATr which is stored in advance may be loaded on the driving memory area 436. The processor 410 may perform an operation for processing a function which is performed based on the loaded driving data DATr.

The storage area 438 may store the user data DATu. The user data DATu may include data associated with an application downloaded by a user. Operations of the storage area 438 have been described with reference to FIGS. 9 and 10. For instance, the user data DATu may not be buffered in the embedded memory 431. Instead, the user data DATu may be directly provided to the external memory 432. As an example embodiment, the user data DATu may be stored in the storage area 438 after being buffered in the main memory area 434.

The external memory 432 may further include an external memory controller which is configured to control an operation for storing the user data DATu in the storage area 438. According to an example embodiment of the present invention, the amount of power consumed to store the user data DATu may be reduced, and speed for storing the user data DATu may become faster.

FIG. 11 illustrates that the external memory 432 includes the main memory area 434, the driving memory area 436, and the storage area 438. However, the present invention is not limited thereto. The external memory 432 may further include another memory area having other function(s).

As an example embodiment, memory areas included in the external memory 432 may be physically separated from one another. In this example embodiment, each of the memory areas included in the external memory 432 may perform its own function in a distinct physical area. As another example embodiment, the memory areas included in the external memory 432 may be logically separated. In this example embodiment, a mapping table which includes information of correspondence between physical memory areas of the external memory 432 and logically distinct areas may be used. For instance, data associated with the mapping table may be stored in the external memory 432 or another memory.

Memory addresses of the memory areas included in the external memory 432 may be determined statically upon manufacturing the mobile electronic device 400. Alternatively, memory addresses of the memory areas included in the external memory 432 may be determined by a user of the mobile electronic device 400, as necessary. Still alternatively, memory addresses of the memory areas included in the external memory 432 may be dynamically changed or modified while the mobile electronic device 400 is being used.

As an example embodiment, the mobile electronic device 400 may be a wearable electronic device. It may be fine that the embedded memory 431 does not have a large buffering capacity when the mobile electronic device 400 is the wearable electronic device. As an example embodiment, the embedded memory 431 may be a SRAM. When the SRAM is embedded in the second semiconductor chip 430 as the embedded memory 431, the amount of active power consumed by the mobile electronic device 400 may be reduced. As an example embodiment, the embedded memory 431 may be a MRAM. When the MRAM is embedded in the second semiconductor chip 430 as the embedded memory 431, it may be possible to obtain the embedded memory 431 having a relatively larger buffering capacity.

As an example embodiment, the external memory 432 may be a PRAM. When the external memory 432 is implemented with the PRAM, stand-by power consumption of the mobile electronic device 400 may be considerably reduced. Further, when the external memory 432 is implemented with the PRAM, the mobile electronic device 400 may operate rapidly.

The processor 410, the embedded memory 431, and the external memory 432 may transmit data in compliance with one or more of various interface protocols, such as USB, SCSI, PCIe, ATA, PATA, SATA, SAS, IDE, UFS, and so on.

Figure 12:
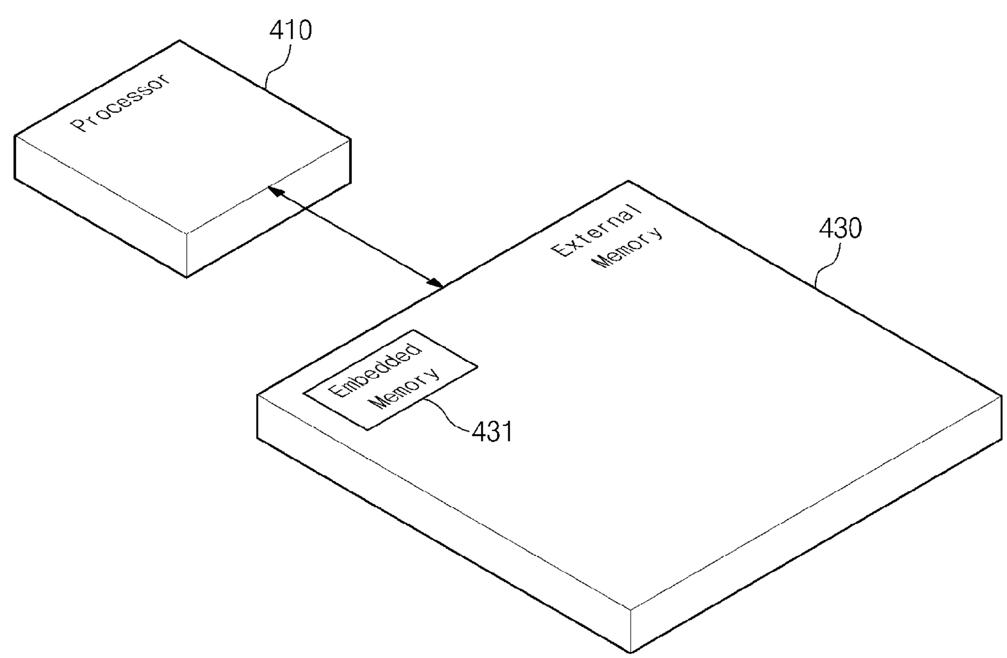
FIG. 12 is a conceptual diagram illustrating a configuration of a mobile electronic device shown in FIG. 11 according to an example embodiment.

FIG. 12 is a conceptual diagram illustrating a configuration of a mobile electronic device 400 shown in FIG. 11 according to an example embodiment.

One or more processor cores C1 through Cn (refer to FIG. 11) included in a processor 410 may be mounted on a first semiconductor chip. An external memory 432 (refer to FIG. 11) may be mounted on the second semiconductor chip 430 which is separated from the first semiconductor chip. The external memory 432 may not share a die with the one or more processor cores C1 through Cn of the processor 410. The external memory 432 may be connected with the one or more processor cores C1 through Cn of the processor 410 via conductive lines or wires for connecting the first semiconductor chip 410 and the second semiconductor chip 430.

An embedded memory 431 may be mounted on the second semiconductor chip 430 together with the external memory 432. For example, the embedded memory 431 may share a die with the external memory 432. The embedded memory 431 may be connected with the one or more processor cores C1 through Cn of the processor 410 via conductive lines or wires for connecting the first semiconductor chip 420 and the second semiconductor chip 430.

When the embedded memory 431 shares a die with the external memory 432, the size of mobile electronic device 400 may decrease, and it is possible to manufacture a memory chip formed of one single semiconductor chip (i.e., the second semiconductor chip 430). Thus, production cost of the memory chip may be lowered. In addition, a configuration of the processor 410 shown in FIGS. 11 and 12 may be simplified as compared with that described with reference to FIGS. 1 and 2.

Figure 13:
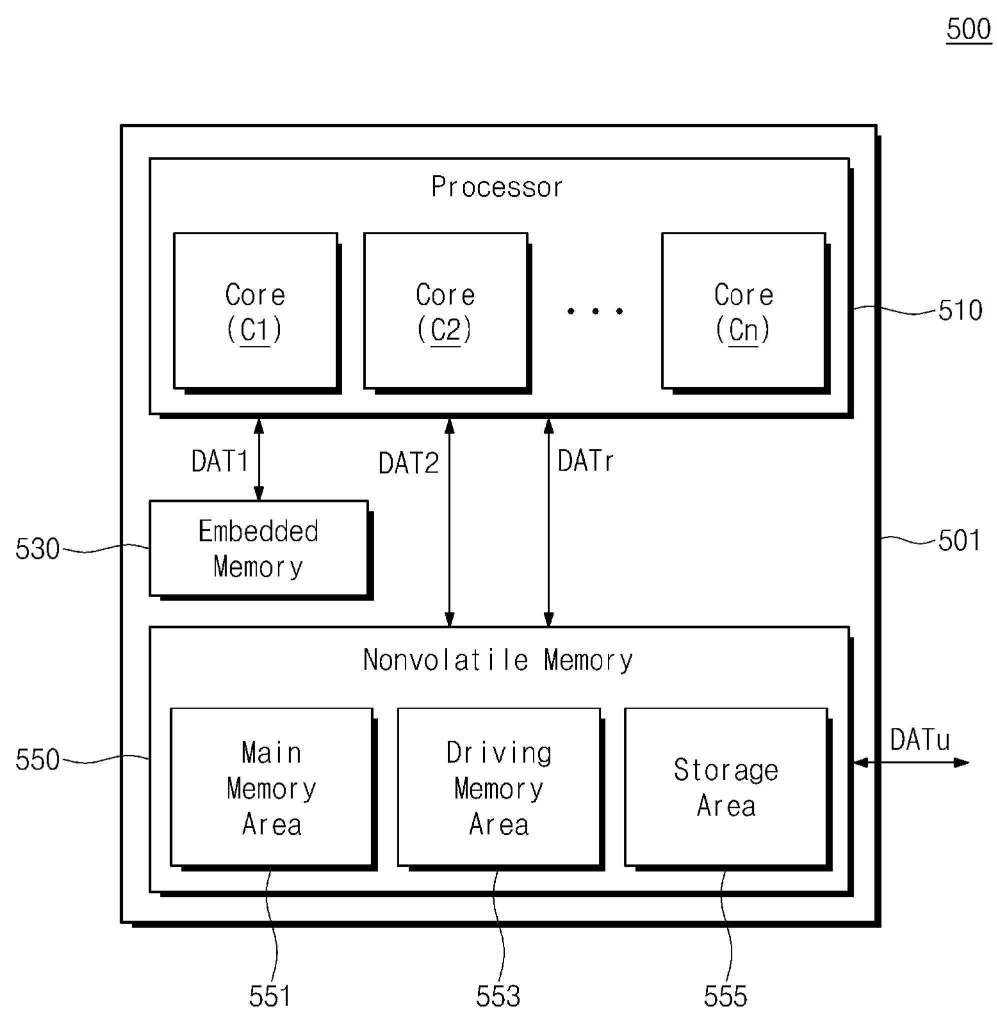
FIG. 13 is a block diagram illustrating a configuration of a mobile electronic device according to an example embodiment of the present invention.

FIG. 13 is a block diagram illustrating a configuration of a mobile electronic device 500 according to an example embodiment of the present invention. A mobile electronic device 500 may include a semiconductor chip 501. In one embodiment, the semiconductor chip 501 may include a processor 510, an embedded memory 530, and a nonvolatile memory 550. For example, the processor 510, the embedded memory 530, and the nonvolatile memory 550 make up the semiconductor chip 501. The semiconductor chip 501 may be all of or part of a system on chip SoC.

The processor 510 may include one or more processor cores C1 through Cn. The one or more processor cores C1 through Cn of the processor 510 may process data and signals. The mobile electronic device 500 may perform its own function with the processed data and signals. For instance, the processor 510 may include, for example, an application processor, a microprocessor, graphics processing unit GPU, or a central processing unit CPU.

As an example embodiment, the processor 510 may include a cache memory. When the cache memory is used, an operating speed of the mobile electronic device 500 may become faster. Descriptions associated with the cache memory have been mentioned with reference to FIGS. 3 and 4.

The embedded memory 530 may exchange first data DAT1 with the processor 510. The first data DAT1 may be data processed or to be processed by the one or more processor cores C1 through Cn of the processor 510. The embedded memory 530 may manage the first data DAT1. For instance, the embedded memory 530 may buffer the first data DAT1. That is, the embedded memory 530 may operate as a buffer memory or a working memory of the processor 510.

The nonvolatile memory 550 may include a main memory area 551, a driving memory area 553, and a storage area 555. The nonvolatile memory 550 may exchange second data DAT2 and driving data DATr with the processor 510. In addition, the nonvolatile memory 550 may exchange user data DATu with a user.

The main memory area 551 may manage the second data DAT2. For instance, the main memory area 551 may buffer the second data DAT2. The second data DAT2 may be data processed or to be processed by the one or more processor cores C1 through Cn of the processor 510. For example, the main memory area 551 may operate similarly to the embedded memory 530.

Operations of the embedded memory 530 and the main memory area 551 have been described with reference to FIGS. 5 through 8. For instance, target data which is frequently accessed, from among multiple pieces of target data processed or to be processed by the one or more processor cores C1 through Cn of the processor 510, may be buffered in the embedded memory 530 as first data DAT1. For example, target data which is not frequently accessed, from among the multiple pieces of target data processed or to be processed by the one or more processor cores C1 through Cn of the processor 510, may be buffered in the main memory area 551 as second data DAT2. Thus, it is possible to minimize the number of accesses to the main memory area 551. As a result, the performance of the mobile electronic device 500 may be optimized, and the life of the nonvolatile memory 550 may not be shortened.

The driving memory area 553 may load the driving data DATr. The driving data DATr may be data used to drive hardware and software. The driving data DATr may be stored in a ROM in advance. Alternatively, the driving data DATr may be stored in the storage area 555 or another memory device in advance. The driving data DATr which is stored in advance may be loaded on the driving memory area 553. The processor 510 may perform an operation for processing a function which is performed based on the loaded driving data DATr.

The storage area 555 may store the user data DATu. The user data DATu may include data associated with an application downloaded by a user. Operations of the storage area 555 have been described with reference to FIGS. 9 and 10. For instance, the user data DATu may not be buffered in the embedded memory 530. Instead, the user data DATu may be directly provided to the nonvolatile memory 550. As an example embodiment, the user data DATu may be stored in the storage area 555 after being buffered in the main memory area 551.

The nonvolatile memory 550 may further include an external memory controller which is configured to control an operation for storing the user data DATu in the storage area 555. According to an example embodiment of the present invention, the amount of power consumed to store the user data DATu may decrease, and speed for storing the user data DATu may become faster.

FIG. 13 illustrates that the nonvolatile memory 550 includes the main memory area 551, driving memory area 553, and storage area 555. However, the present invention is not limited thereto. For instance, the nonvolatile memory 550 may further include another memory area having other function(s).

As an example embodiment, memory areas included in the nonvolatile memory 550 may be physically separated from one another. In this example embodiment, each of the memory areas included in the nonvolatile memory 550 may perform its own function in a distinct physical area. As another example embodiment, the memory areas included in the nonvolatile memory 550 may be logically separated. In this example embodiment, a mapping table which includes information of correspondence between physical memory areas of the nonvolatile memory 550 and logically distinct areas may be used. For instance, data associated with the mapping table may be stored in the nonvolatile memory 550 or another memory.

Memory addresses of the memory areas included in the nonvolatile memory 550 may be determined statically upon manufacturing the mobile electronic device 500. Alternatively, memory addresses of the memory areas included in the nonvolatile memory 550 may be determined by a user of the mobile electronic device 500, as necessary. Still alternatively, memory addresses of the memory areas included in the nonvolatile memory 550 may be dynamically changed or modified while the mobile electronic device 400 is being used.

As an example embodiment, the mobile electronic device 500 may be a wearable electronic device. It may be fine that the embedded memory 530 does not have a large buffering capacity when the mobile electronic device 500 is the wearable electronic device. As an example embodiment, the embedded memory 530 may be a SRAM. When the SRAM is embedded in the semiconductor chip 501 as the embedded memory 530, the amount of active power consumed by the mobile electronic device 500 may be reduced. As an example embodiment, the embedded memory 530 may be a MRAM. When the MRAM is embedded in the semiconductor chip 501 as the embedded memory 530, it may be possible to obtain the embedded memory 530 having a relatively larger buffering capacity.

As an example embodiment, the nonvolatile memory 550 may be a memory which is randomly accessed in byte unit. For instance, the nonvolatile memory 550 may be a PRAM. When the nonvolatile memory 550 is implemented with the PRAM, stand-by power consumption of the mobile electronic device 500 may be considerably reduced. Also, when the nonvolatile memory 550 is implemented with the PRAM, the mobile electronic device 500 may operate rapidly.

In one embodiment the nonvolatile memory 550 may have a storage capacity greater than the embedded memory 530, and the embedded memory 530 may have a storage capacity greater than the cache memory.

The processor 510, the embedded memory 530, and the nonvolatile memory 550 may transmit data in compliance with one or more of various interface protocols, such as USB, SCSI, PCIe, ATA, PATA, SATA, SAS, IDE, UFS, and so on.

Figure 14:
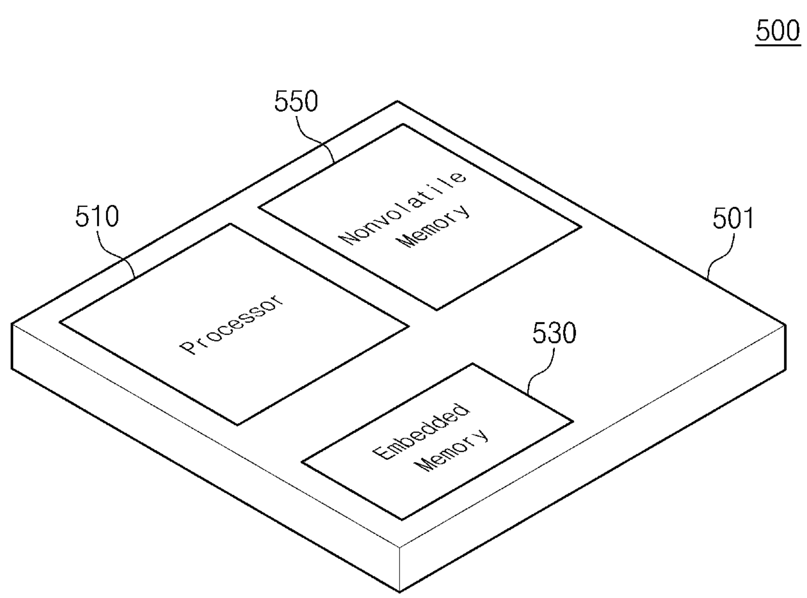
FIG. 14 is a conceptual diagram illustrating a configuration of a mobile electronic device shown in FIG. 13 according to an example embodiment.

FIG. 14 is a conceptual diagram illustrating a configuration of a mobile electronic device 500 shown in FIG. 13 according to an example embodiment.

One or more processor cores C1 through Cn (refer to FIG. 13) included in a processor 510, an embedded memory 530, and a nonvolatile memory 550 (refer to FIG. 13) may be mounted on a single semiconductor chip 501. The one or more processor cores C1 through Cn of the processor 510, the embedded memory 530, and the nonvolatile memory 550 may share a die. The embedded memory 530 and the nonvolatile memory 550 may be connected with the one or more processor cores C1 through Cn of the processor 510 via conductive lines (e.g., metal lines) which are provided on a substrate (e.g., a silicon layer) of the semiconductor chip 501.

When the embedded memory 530 shares a die with the processor 510, the length of an input/output channel for transmitting first data DAT1 (refer to FIG. 13) between the processor 510 and the embedded memory 530 may be shortened, and an input/output logic and a driver for controlling an input/output of the first data DAT1 may be removed. In addition, when the processor 510 shares a die with the nonvolatile memory 550, the length of an input/output channel for transmitting second data DAT2 (refer to FIG. 13) between the processor 510 and the nonvolatile memory 550 may be shortened, and an input/output logic and a driver for controlling an input/output of the second data DAT2 may be removed. Thus, the amount of power consumed to transmit the first data DAT1 and the second data DAT2 may be reduced. Further, time taken to transmit the first data DAT1 and the second data DAT2 may be shortened, thus, the total amount of energy consumed by the mobile electronic device 500 may be reduced.

When the processor 510, the embedded memory 530, and the nonvolatile memory 550 share a die, the size of mobile electronic device 500 may decrease, and the amount of power consumed by the mobile electronic device 500 may be reduced. In particular, when the mobile electronic device 500 is a wearable electronic device, the wearable electronic device having a small size and capable of being used for a long time may improve user satisfaction.

Figure 15:
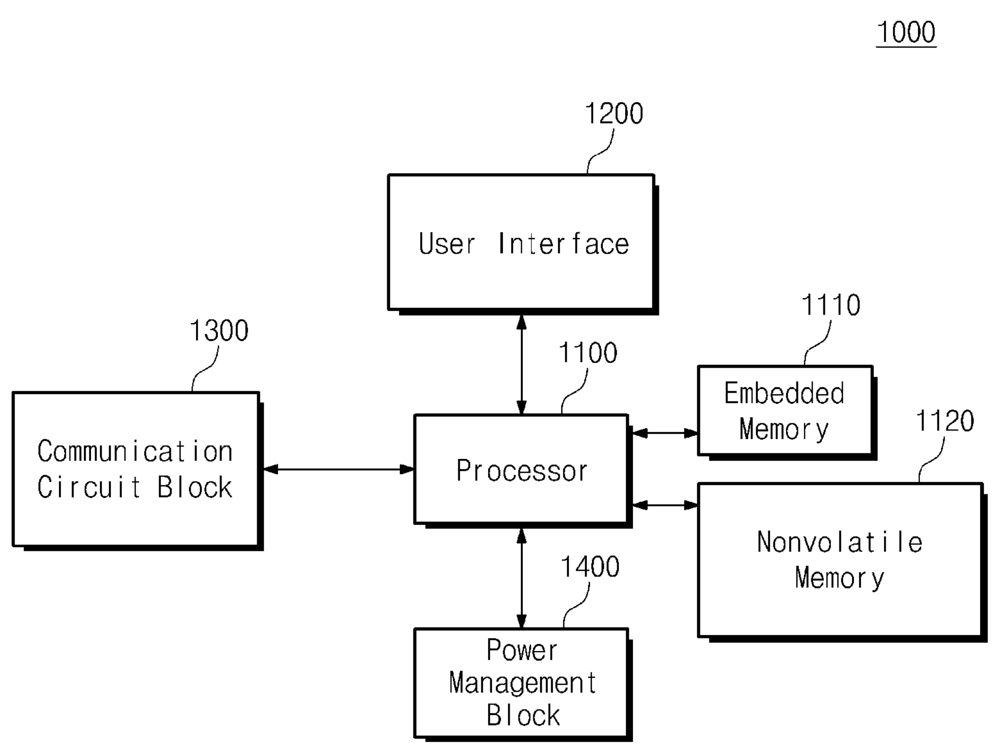
FIG. 15 is a block diagram illustrating a configuration of a mobile electronic device according to an example embodiment of the present invention.

FIG. 15 is a block diagram illustrating a configuration of a mobile electronic device 1000 according to an example embodiment of the present invention. Referring to FIG. 15, the mobile electronic device 1000 may include a processor 1100, an embedded memory 1110, a nonvolatile memory 1120, a user interface 1200, a communication circuit block 1300, and a power management block 1400. As an example embodiment, the mobile electronic device 1000 may be a wearable electronic device.

The processor 1100 may control the overall operations of the mobile electronic device 1000. The processor 1100 may include one or more processor cores. As an example embodiment, the processor 1100 may include, for example, an application processor, a microprocessor, graphics processing unit GPU, or a central processing unit CPU.

The embedded memory 1110 may exchange data with the processor 1100. For instance, the embedded memory 1110 may buffer data processed or to be processed by the one or more processor cores included in the processor 1100. For example, the embedded memory 1110 may operate as a buffer memory or a working memory of the processor 1100. As an example embodiment, the embedded memory 1110 may be a SRAM or a MRAM.

The nonvolatile memory 1120 may exchange data with the processor 1100. In addition, the nonvolatile memory 1120 may exchange data with a user. The nonvolatile memory 1120 may retain data regardless of whether power is supplied. As an example embodiment, the nonvolatile memory 1120 may include a main memory area, a driving memory area, and a storage area, which are described with reference to FIGS. 1, 11, and 13. As an example embodiment, the nonvolatile memory 1120 may be a PRAM.

The processor 1100, the embedded memory 1110, and the nonvolatile memory 1120 may be implemented based on one of example embodiments of the present invention. For instance, as described with reference to FIGS. 1 and 2, the embedded memory 1110 may share a die with the processor 1100. For instance, as described with reference to FIGS. 11 and 12, the embedded memory 1110 may share a die with the nonvolatile memory 1120. For instance, as described with reference to FIGS. 13 and 14, the processor 1100, the embedded memory 1110, and the nonvolatile memory 1120 may be mounted on one single semiconductor chip. Further, the processor 1100, the embedded memory 1110, and the nonvolatile memory 1120 may have configurations and functions described with reference to FIGS. 3 through 10.

The user interface 1200 may control communication between a user and the mobile electronic device 1000 under a control of the processor 1100. For instance, the user interface 1200 may include user input interfaces, such as a keyboard, a keypad, a button, a touch panel, a touch screen, a touch pad, a touch ball, a camera, a microphone, a gyroscope sensor, a vibration sensor, and so on. The user interface 1200 may further include user output interfaces, such as a liquid crystal display (LCD), a light emitting diode (LED) display, an organic LED (OLED) display device, an active matrix OLED (AMOLED) display device, a speaker, a motor, and so on.

The communication circuit block 1300 may communicate with an external device according to a control of the processor 1100. The communication circuit block 1300 may communicate with the external device in compliance with one or more of various wired and/or wireless communication protocols. For instance, the communication circuit block 1300 may communicate with the external device in compliance with at least one of wireless communication protocols such as long term evolution (LTE), worldwide interoperability for microwave access (WiMax), global system for mobile communication (GSM), code division multiple access (CDMA), Bluetooth, near field communication (NFC), wireless fidelity (WiFi), radio frequency identification, and so on, and/or wired communication protocols such as USB, SCSI, PCIe, ATA, PATA, SATA, SAS, IDE, UFS, Fireware, and so on.

The power management block 1400 may manage power required to operate the mobile electronic device 1000. The power management block 1400 may include a power management integrated circuit (PMIC) for managing power to be supplied to each component of the mobile electronic device 1000. In addition, the power management block 1400 may include a charging circuit for charging a battery which supplies power to the mobile electronic device 1000. As an example embodiment, the charging circuit may include a wired charging circuit for charging a battery through a conduction line. As an example embodiment, the charging circuit may include a wireless charging circuit for charging a battery by using magnetic resonance without a conduction line.

Figure 16:
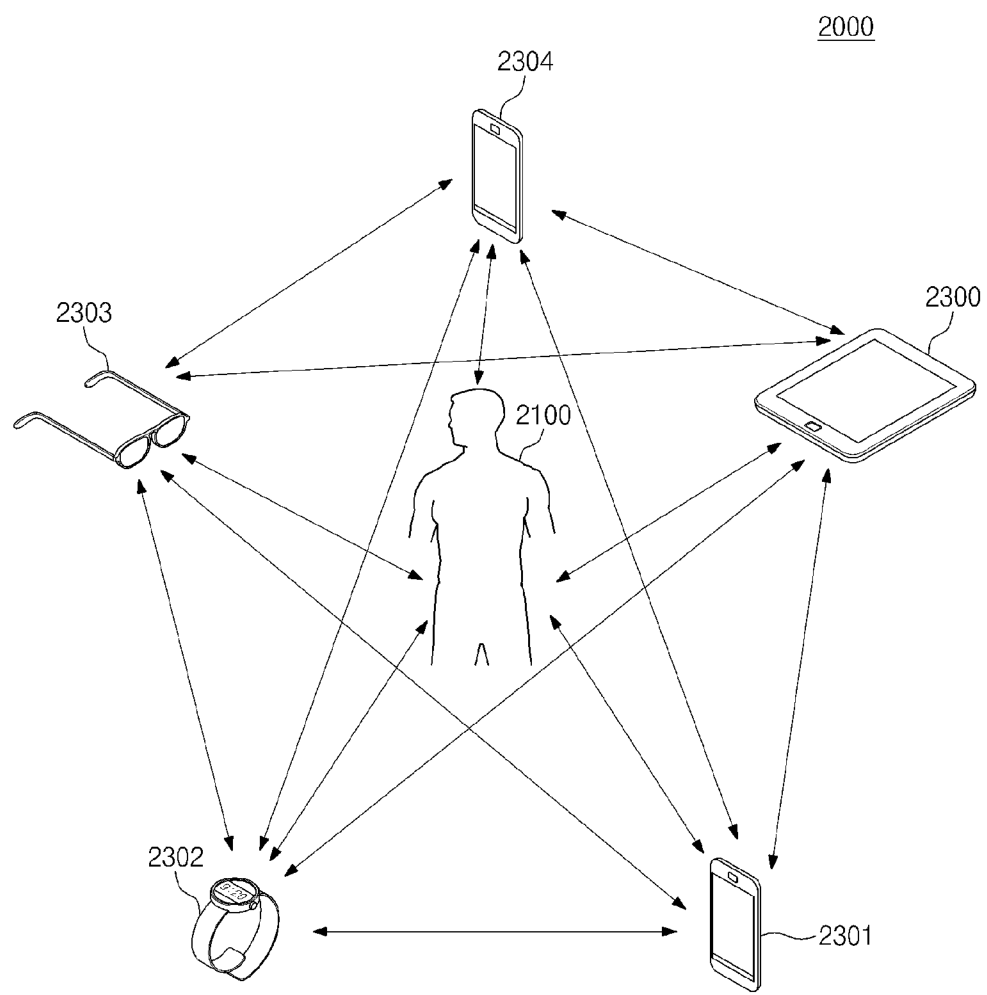
FIG. 16 is a conceptual diagram illustrating an internet of things (IoT) system according to example embodiments of the present invention.

FIG. 16 is a conceptual diagram illustrating an internet of things (IoT) system 2000 according to example embodiments of the present invention.

Each of mobile electronic devices 2300 through 2304 may be a portable terminal, a personal digital assistant (PDA), a portable multimedia player (PMP), a digital camera, a smart phone, a tablet, or a wearable electronic device. Each of the mobile electronic devices 2300 through 2304 may be implemented based on one or more of example embodiments of the present disclosure described with reference to FIGS. 1 through 15.

Each of the mobile electronic devices 2300 through 2304 may exchange information with a user 2100. The mobile electronic devices 2300 through 2304 may exchange information with one another. The user and the mobile electronic devices 2300 through 2304 may exchange information with one another through the Internet.

Configurations illustrated in each conceptual diagram should be understood from a conceptual point of view. Shape, structure, and size of each component shown in a conceptual diagram are exaggerated or downsized to help understanding of the present invention. Actually implemented configurations may be different from those of each conceptual diagram. Each conceptual diagram is not intended to limit the physical shape of the component.

A device configuration shown in each block diagram intends to help understanding of the present invention. Each block may be formed of smaller blocks according to a function. Alternatively, a plurality of blocks may form a larger unit of block according to functions. That is, the present invention is not limited to components shown in each block diagram.

While the present invention has been described with reference to example embodiments, it will be apparent to those skilled in the art that various changes and/or modifications may be made without departing from the spirit and scope of the present invention. Therefore, it should be understood that the above-mentioned example embodiments are not limiting, but illustrative.

What is claimed is:

1. An electronic device comprising:

a first semiconductor chip comprising a processor and a first memory configured to exchange first data with the processor; and a second semiconductor chip comprising a second memory configured to exchange second data with the processor, wherein the processor is configured to exchange target data processed or to be processed with the first and second memories, wherein the processor is configured to determine the target data as the first data, in order to store the target data in the first memory if the number of accesses of the target data is equal to or greater than a first reference value, wherein the processor is configured to determine the target data as the second data, in order to store the target data in the second memory if the number of accesses of the target data is less than the first reference value, wherein the second memory is a phase-change RAM (PRAM), and wherein the second memory is configured to store user data directly provided from a user without being buffered in the first memory.

2. The electronic device of claim 1, wherein the first memory has a storage capacity less than the second memory.

3. The electronic device of claim 2, wherein the first semiconductor chip further includes a third memory configured to exchange third data with the processor, the third memory having a storage capacity less than the first memory.

4. The electronic device of claim 3, wherein the processor is configured to access the target data from the third memory when the target data is stored in the third memory, and wherein the processor is configured to access the target data from the first memory or the second memory when the target data is not stored in the third memory.

5. The electronic device of claim 1, wherein the second memory comprises:

a main memory area configured to buffer the first data;

a driving memory area configured to load data used to drive hardware and software; and a storage area configured to store the user data.

6. The electronic device of claim 5, wherein the second memory further comprises:

a memory controller configured to control the second memory such that the user data is stored in the storage area after being buffered in the main memory area.

7. The electronic device of claim 1, wherein the first memory is a static random access memory (SRAM) or a magneto-resistive RAM (MRAM).

8. The electronic device of claim 1, wherein the first semiconductor chip and the second semiconductor chip are portions of different wafers.

9. The electronic device of claim 1, wherein the processor is configured to determine the target data as the first data when a time interval value between a currently accessed time and a recently accessed time associated with the target data is equal to or smaller than a second reference value, and wherein the processor is configured to determine the target data as the second data when the time interval value is greater than the second reference value.

10. An electronic device comprising:

a processor;

a first memory configured to exchange first data with the processor; and a second memory having a storage capacity greater than the first memory, and configured to exchange second data with the processor, wherein the processor and the first and second memories are included in a single semiconductor chip, wherein the processor is configured to exchange target data processed or to be processed with the first and second memories, wherein the processor is configured to determine the target data as the first data, in order to store the target data in the first memory if the number of accesses of the target data is equal to or greater than a first reference value, wherein the processor is configured to determine the target data as the second data, in order to store the target data in the second memory if the number of accesses of the target data is less than the first reference value, and wherein the second memory is configured to store user data directly provided from a user without being buffered in the first memory.

11. The electronic device of claim 10, wherein the single semiconductor chip further comprises a third memory configured to exchange third data with the processor, the third memory having a storage capacity less than the first memory.

12. The electronic device of claim 10, wherein the first memory is a static random access memory (SRAM) or a magneto-resistive RAM (MRAM), and the second memory is a phase-change RAM (PRAM).

13. The electronic device of claim 10, wherein the single semiconductor chip is a portion of a wafer.

14. A method of operating an electronic device, the method comprising:

exchanging first data between a processor and a first memory, the processor and the first memory included in a first semiconductor chip;

exchanging second data between the processor and a second memory included in a second semiconductor chip;

receiving an access request with respect to target data processed or to be processed by the processor;

determining the target data as the first data and storing the target data in the first memory if the number of accesses of the target data is equal to or greater than a first reference value; and determining the target data as the second data and storing the target data in the second memory if the number of accesses of the target data is less than the first reference value, wherein the first memory is a static random access memory (SRAM) or a magneto-resistive RAM (MRAM), and the second memory is a phase-change RAM (PRAM), and wherein the second memory is configured to store user data directly provided from a user without being buffered in the first memory.

15. The method of claim 14, wherein the first memory has a storage capacity less than the second memory.

16. The method of claim 14, further comprising:

accessing the target data from a third memory if the target data is stored in the third memory included in the first semiconductor chip, or accessing the target data from the first or the second memory if the target data is not stored in the third memory.

17. The method of claim 16, wherein the third memory is a static random access memory (SRAM) or a magneto-resistive RAM (MRAM) having a storage capacity less than the first memory.

18. The method of claim 14, further comprising:

determining the target data as the first data and storing the target data in the first memory if a time interval value between a currently accessed time and a recently accessed time associated with the target data is equal to or less than a second reference value; and determining the target data as the second data and storing the target data in the second memory if the time interval value is greater than the second reference value.

* * * * *